US009170828B2

(12) United States Patent
Borve et al.

(10) Patent No.: US 9,170,828 B2
(45) Date of Patent: Oct. 27, 2015

(54) EXTRACTION OF OPERATING SYSTEM-SPECIFIC CHARACTERISTICS VIA A COMMUNICATION INTERFACE

(71) Applicant: Microsoft Technology Licensing, LLC, Redmond, WA (US)

(72) Inventors: Martin Richard Borve, Shoreline, WA (US); Andrea A. Keating, Seattle, WA (US); Philip Albert Froese, Redmond, WA (US); Randall Aull, Kenmore, WA (US); Firdosh K. Bhesania, Kirkland, WA (US); Eliyas Yakub, Sammamish, WA (US); Robert Harris, Jr., Woodinville, WA (US); Vivek Gupta, Bothell, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 13/896,195

(22) Filed: May 16, 2013

(65) Prior Publication Data
US 2014/0344480 A1 Nov. 20, 2014

(51) Int. Cl.
G06F 3/00 (2006.01)
G06Q 30/00 (2012.01)
G06F 9/445 (2006.01)
G06F 9/44 (2006.01)

(52) U.S. Cl.
CPC .......... *G06F 9/44536* (2013.01); *G06F 9/4411* (2013.01)

(58) Field of Classification Search
CPC ...... G06F 21/64; G06F 21/445; G06F 21/572
See application file for complete search history.

(56) References Cited

U.S. PATENT DOCUMENTS

| | | | |
|---|---|---|---|
| 7,200,632 B1* | 4/2007 | Greschler et al. | 709/203 |
| 2005/0060447 A1 | 3/2005 | Tanaka | |
| 2007/0044148 A1* | 2/2007 | Goodman et al. | 726/16 |
| 2008/0134316 A1* | 6/2008 | Devonshire et al. | 726/15 |
| 2009/0248907 A1 | 10/2009 | Huang et al. | |
| 2011/0153465 A1* | 6/2011 | Pombo et al. | 705/27.1 |
| 2013/0031277 A1 | 1/2013 | Lu et al. | |

FOREIGN PATENT DOCUMENTS

EP 1221653 A2 7/2002

OTHER PUBLICATIONS

Universal Serial Bus Specification Revison 2.0, Apr. 27, 2000, Compaq, HP, Intel, Lucent, Microsoft, NEC, Philips.*
Martin Borve, USB 2.1, 2.0, 1.1. device enumeration changes in Window 8, Apr. 11, 2013, MSFT.*
International Search Report and Written Opinion for PCT/US2013/060996 mailed Mar. 27, 2014.

* cited by examiner

Primary Examiner — Hyun Nam
(74) Attorney, Agent, or Firm — Merchant & Gould P.C.

(57) ABSTRACT

Systems and methods for specifying extended descriptor information in a device accessed using a communication interface are disclosed. One method includes transmitting a request to a device from a host computing system, and receiving an extended capability descriptor identifying to the host computing system at least one extended descriptor set stored on the device. The extended capability descriptor identifies a minimum operating system version able to support a corresponding extended descriptor set.

17 Claims, 10 Drawing Sheets

EXTRACTION OF OPERATING SYSTEM-SPECIFIC CHARACTERISTICS VIA A COMMUNICATION INTERFACE

BACKGROUND

The Universal Serial Bus (USB) is a communication interface that supports data exchange between a host computer and a wide range of simultaneously accessible peripheral devices. The attached peripheral devices operate using a host-scheduled, token-based protocol. The bus allows peripherals to be attached, configured, used, and detached while the host and other peripherals are in operation.

USB is defined by a specification that is approved by a committee of industry representatives. This USB specification is available from USB Implementers Forum (current Internet URL: www.usb.org). The USB specification covers all aspects of USB operation, including electrical, mechanical, and communications characteristics. To be called a USB device, a peripheral conforms to this specification.

USB device information is typically stored in so-called "descriptors." Descriptors are used in a USB system to identify the device to a host system, for example so that the host computer can select and execute appropriate software used to interface with the device connected to that host computer. The host computer transmits control requests to retrieve descriptors from the device. Independent hardware vendors (IHVs) can also store class and vendor-specific descriptors. However, the flexibility of use of these descriptors, as well as their ensured compatibility, is limited. For example, such descriptors are either limited by the types of descriptors included in the specification of the communication interface (e.g., USB) with which the device is associated, or else the descriptors may be limited as to their compatibility with various host computing systems that may receive such devices.

It is with respect to this general technical environment that the embodiments of the present application are directed.

SUMMARY

In summary, the present disclosure relates to systems and methods for specifying extended capability descriptor information in a device accessed using a Universal Serial Bus (USB) interface. The extended capability descriptor information described herein allows for operating system-specific functionality to be provided by a device, while also maintaining compatibility with devices that do not implement extended descriptors. In some cases, the extended descriptors are associated with a device, device configuration, or function of a device, thereby allowing a host computing system to address a device at differing scopes. Furthermore, in some embodiments, the extended capability descriptors can be used, for example based on the version or type of operating system of the host computing system, with different configurations and/or functionalities, thereby allowing the same device to have differing characteristics based on the host computing system to which it is connected. Additionally, the extended capability descriptor can identify that the device supports an alternative set of standard descriptors to be used with a device based, for example, on a minimum operating system version of the host computing system.

In embodiments, a system includes a programmable circuit and a memory communicatively interfaced to the programmable circuit and configured to store computing instructions. When executed by the programmable circuit, the computing instructions cause the programmable circuit to, in response to receiving a request at a device via an interface communicatively connecting the device to a host computing system, communicate a platform capability descriptor to the host computing system. The platform capability descriptor includes one or more elements each identifying a different extended capability descriptor set associated with the device, at least one of the elements identifying a minimum operating system version able to support a corresponding extended capability descriptor set.

In additional embodiments, a method includes transmitting a request to a device from a host computing system, and receiving an extended capability descriptor identifying to the host computing system at least one extended descriptor set stored on the device. The extended capability descriptor identifies a minimum operating system version able to support a corresponding extended descriptor set.

In further embodiments, a computer-implemented storage medium is disclosed that includes computer-executable instructions stored thereon. When executed by a computing device, the instructions cause the computing device to perform a method that includes transmitting a request to a device for one or more descriptors stored at the device, the one or more descriptors including an extended capability descriptor. The request is transmitted from a host computing system via an interface communicatively connecting the device to the host computing system. The method also includes receiving the extended capability descriptor at the host computing system, wherein the extended capability descriptor includes one or more elements each identifying a different extended capability descriptor set associated with the device. At least one of the elements identifies a minimum operating system version able to support a corresponding extended descriptor set. The method further includes transmitting a second request to the device from the host computing system, the second request corresponding to a request for an extended descriptor set identified based on contents of the extended capability descriptor and an operating system of the host computing system. The method also includes, in response to the second request, receiving a set of extended descriptors useable to enumerate the device with the host computing system, and defining functionality supported by the operating system of the host computing system.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

As briefly described above, embodiments of the present disclosure are directed to systems and methods for specifying extended capability descriptor information in a device accessed using a communication interface, for example between a host computing system and a peripheral device. The extended capability descriptor information described herein allows for operating-system-specific functionality or information to be provided by a device, while also maintaining compatibility with devices that do not implement such extended capability descriptors, or which implement prior versions of descriptors. Additionally, other types of configuration-specific information can be determined, such as the nature of the host computing system to which a device is connected (e.g., the operating system or computing architecture of the host system), or the type of connection used (e.g., a USB standard or low-power connection). Additionally, specific operating system settings and custom device-specific settings can be provided using such descriptors as well.

In general, USB devices that include operating system ("OS") descriptors have been developed. When OS descriptors are integrated into a device, host devices can run operating systems that use those OS descriptors, and can use control requests to retrieve the information. The retrieved information is then used to install and configure the USB device without requiring user interaction. However, a current implementation of such OS descriptors has drawbacks. For example, in some cases, where a USB device lacked such an OS descriptor, that device would fail when the OS descriptor is requested by a host computing system. Furthermore, OS descriptors are currently unable to provide any specific information that is based on identification of differing versions of an operating system of the host device; in other words, current OS descriptors are either present and able to be accessed by an operating system, or they are not. Still further, current OS descriptors are defined at an interface level, rather than at a device level; accordingly, descriptors for multifunction devices define features of a particular function, rather than features of the device as a whole. As further discussed below, OS descriptors defined according to the present disclosure allow for scoping of information to an appropriate level, whether that be associated, for example, with the device, a configuration of the device, or a function included in the device.

Figure 1:
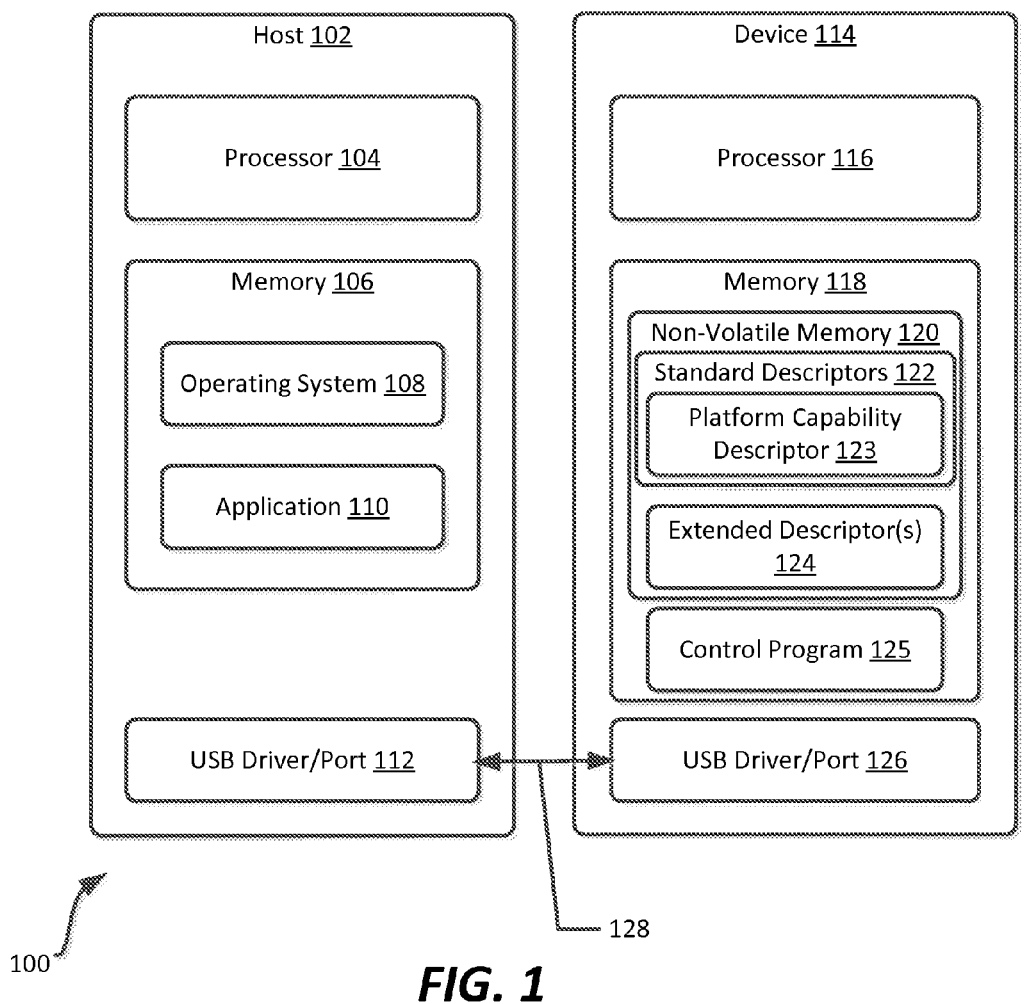
FIG. 1 is a block diagram of an exemplary system, according to an example embodiment, including a host computing system and a device connected via a USB interface.

Referring now to FIG. 1, a system 100 is shown in which a device connected using a communication interface includes non-standard device, configuration, and function class and subclass codes. Additionally, the system includes a host application program and host operating system that is able to enumerate non-standard compatible IDs, or non-standard class and subclass code corresponding to devices. In the embodiment shown, system 100 is compatible with the Universal Serial Bus (USB) specifications. These specifications are available from USB Implementers Forum (current Internet URL: www.usb.org).

System 100 includes a host computing system 102 and a device 114, such as a USB peripheral device or other peripheral device communicatively connected to a host computer (e.g., using the IEEE 1394 serial bus interface or a Bluetooth wireless interface). The respective functionality of the computer and peripheral device is embodied in many cases by computer-executable instructions, such as program modules, that are executed by respective processors. Generally, program modules include routines, programs, objects, components, data structures, etc. that perform particular tasks or implement particular abstract data types.

Host computing system 102 is a computing system, such as a desktop, laptop, tablet, or other computing device, such as are described below and illustrated in FIGS. 10-12. Host computing system 102 has one or more processors 104 and one or more forms of memory 106 such as electronic memory, magnetic storage media, optical storage media, or some other type of data storage. Programs are stored in memory 106 from where they are executed by processor 104. In this example, such programs include an operating system 108 such as the MICROSOFT WINDOWS® family of operating systems. The operating system 108 provides various system services to one or more application programs 110 running on the host computing system 102, and can be any of a variety of types or versions of an operating system.

In the embodiment shown, the computer also has a USB communications driver and USB port 112. The USB port 112 is supported by operating system 108. To communicate with a device via the USB port, an application program 110 makes high-level calls to system services provided by the operating system. The system services take care of lower level communications details, and return requested information to the application program.

Device 114 can be, in various embodiments, any of a number of different types of devices such as a data storage device, a digital camera, a scanner, a joystick, game pad, steering unit, mouse, stylus, digital speaker, microphone, display device, and the like. In some embodiments, device 114 can be another computing system, such as a mobile phone or tablet computing system. In such embodiments, device 114 has one or more processors 116 and one or more forms of memory 118, including at least some form of non-volatile memory 120. In alternative embodiments, the device may lack such processors or memory 118. In the example embodiment shown, the device 114 communicatively connects to the host computing system 102.

In the embodiment shown, the device 114 has a USB port 126 and communicates with host computing system 102 via a USB communications interface 128. The device also optionally has operating logic which is executed by processor 116 to detect control actuation and for communicating with host computing system 102 across communication interface 128.

As is further discussed below, the device 114 responds to requests from the host computing system 102 across the communication interface 128. These requests are made using control transfers where setup packets (not shown) are exchanged. In some cases (such as those discussed herein), the device 114 returns descriptors in response to exchanging such setup packets. The USB Specification defines a number of standard descriptors 122, including an extended capability descriptor 123. As used in the present disclosure, extended capability descriptor 123 corresponds to a standard descriptor that can include a particular value that indicates to a host computing system 102 that the device 114 includes one or more extended descriptors 124. The extended descriptors 124, in turn, correspond to descriptors that are specific to a particular operating system of a host system and not defined in the specification of a particular communication standard. In the context of a USB interface, an extended capability descriptor would be defined in the USB specification, which is impartial across operating systems; however, the extended descriptors 124 would not be defined in that specification. Still further in the context of a USB interface, the extended capability descriptor 123, and implicated extended descriptors 124, allow original equipment manufacturers ("OEMs") and/or independent hardware vendors ("IHVs") to store non-standard codes—those specific values representing capabilities that are not yet defined or supported by the USB Device Working Group (at www.usb.org), for example using logic or storing such non-standard codes into non-volatile memory 120 of the device. Moreover, the extended capability descriptor 123 and extended descriptors 124 described herein provides a way for a composite device (e.g., a device having more than one function, such as a combined printer/scanner/facsimile peripheral device) to specify a group of interfaces that comprise a single function, and to allow the host computing system 102 to address either the device as a whole or each interface individually.

In embodiments, device 114 supports host-specific device requests to obtain information in accordance with a particular communication specification (e.g., USB, Bluetooth, IEEE 1394, etc.). In response to the request, the peripheral device provides the extended capability descriptor 123 to the host computing system 102. Based on the contents of the extended capability descriptor 123, the host computer 102 is informed as to whether the device 114 supports extended descriptors 124 that are outside of the set of standard descriptors 122. For example, in some embodiments, the extended capability descriptor 123 can include a particular value that indicates that extended descriptors 124 are supported. The extended capability descriptor 123 can also contain identification of one or more sets of such extended descriptors 124, for example, which can be used with different versions of an operating system of the host computing system 102. The sets of extended descriptors can also define, for example primary and alternative sets of functionality of the device 114, allowing different functionalities to be selectively enabled for a particular device. Details regarding the extended capability descriptor 123 are discussed in further detail in connection with FIG. 7; details regarding example loading of extended capability descriptor 123 and extended descriptors 124 are provided below in connection with FIGS. 8-9.

Figure 2:
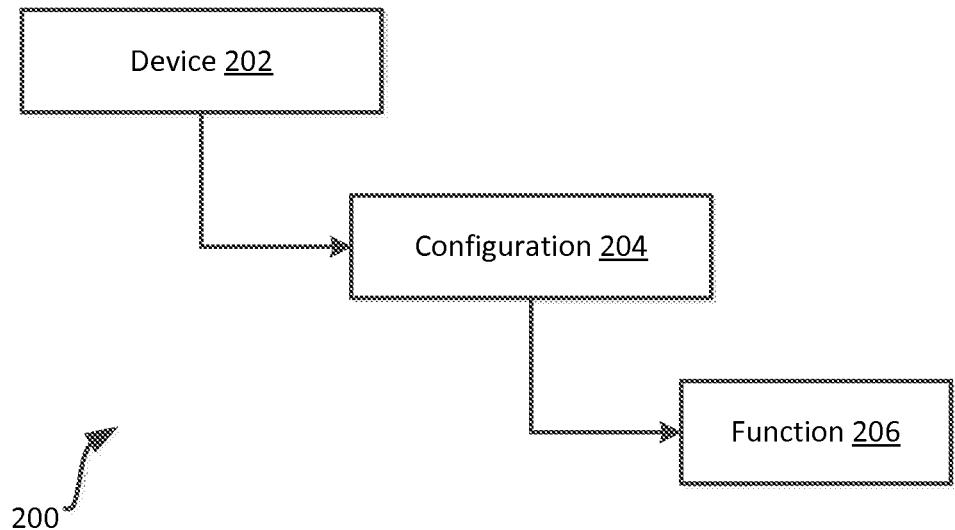
FIG. 2 is a hierarchical diagram of extended capability descriptors available using the methods and systems discussed herein.

Referring now to FIG. 2, it is noted that, as further described in the present disclosure, as compared to preexisting standard descriptors and existing extended descriptors, use of the extended capability descriptor 123, and the extended descriptors 124 of the present disclosure allows properties to be set at varying scope levels. For example, as illustrated in FIG. 2, the extended descriptors 124 can be set at a device-wide scope 202, a device configuration scope 204, or a specific interface or function scope 206. Other scopes, such as an endpoint scope, could be defined as well. As illustrated in FIGS. 2-6, the descriptor set is organized as nested groups of descriptor subsets that can describe properties specific to a particular scope of the subset in which they are contained.

As noted above, extended descriptors 124 can be associated with any of the device, device configuration, or function. In the case of device-wide scope 202, the extended descriptors 124 can include feature descriptions associated with the device and having a device-wide scope 202. In the case of device configuration scope 204, the extended descriptors 124 can describe functionalities of the device that are available depending upon a particular configuration of the device. Similarly, extended descriptors 124 having a function level scope 206 can correspond to either functions or function subsets available to a system that supports the extended capability descriptor 123, as would be available at the interface level of the device when implemented with OS descriptors.

Figure 3:
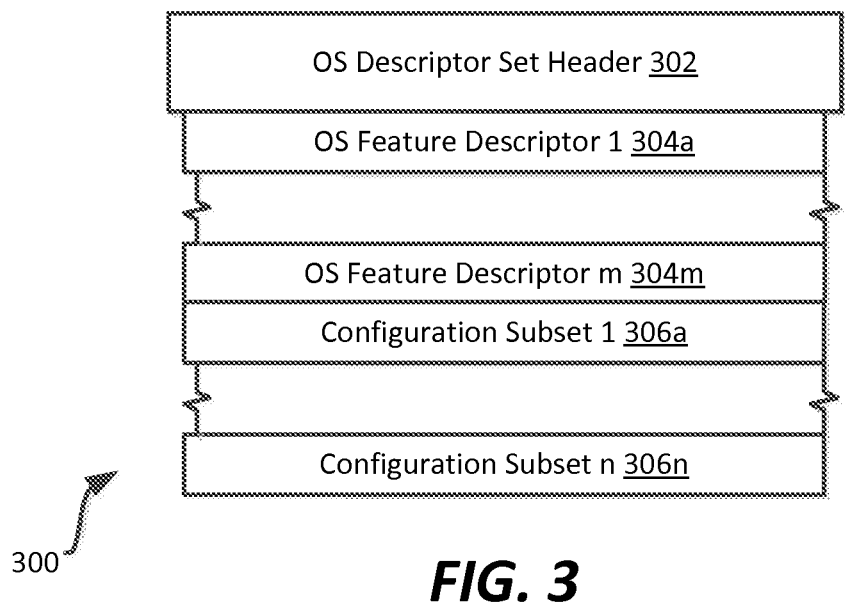
FIG. 3 is a logical diagram illustrating an organization of device-level characteristics of an extended capability descriptor set, according to an example embodiment.

Referring to FIGS. 3-6, and as noted above, extended descriptors 124 are illustrated at the entire device-wide scope 202, device configuration scope 204, and specific interface or function scope 206 (e.g., referred to herein as "feature" descriptors). As seen in FIG. 3, an example layout 300 of a set of extended descriptors 124 contains, at the device level (e.g., level 202), a descriptor set header 302 and zero or more feature descriptors 304a-m. The feature descriptors 304a-m are included in the set of extended descriptors 124, and apply to the whole device regardless of configuration. The set of extended descriptors further includes zero or more configuration subsets 306a-n that apply to specific device configurations. There are generally one or more feature descriptors or configuration subset descriptors defined in the device level descriptor set. Additionally, other scopes (e.g., endpoint level scope) could be used as well, with one or more descriptor types implemented having that scope.

The descriptor set header 302 includes a descriptor index (wIndex) and optionally an operating system version identifier defining a minimum operating system version that supports the descriptor set. Additionally, a size of the descriptor set and version number can be included in the header 302 as well. The feature descriptors 304a-m can take a number of forms, as discussed below, and are defined to be the feature descriptors that are applicable at the device level 202. The configuration subsets 306a-n correspond to definitions of features applicable at the configuration level 204 or in some cases at the function level 206 (e.g., if a function subset resides within one of the configuration subsets 306a-n, as noted below).

Figure 4:
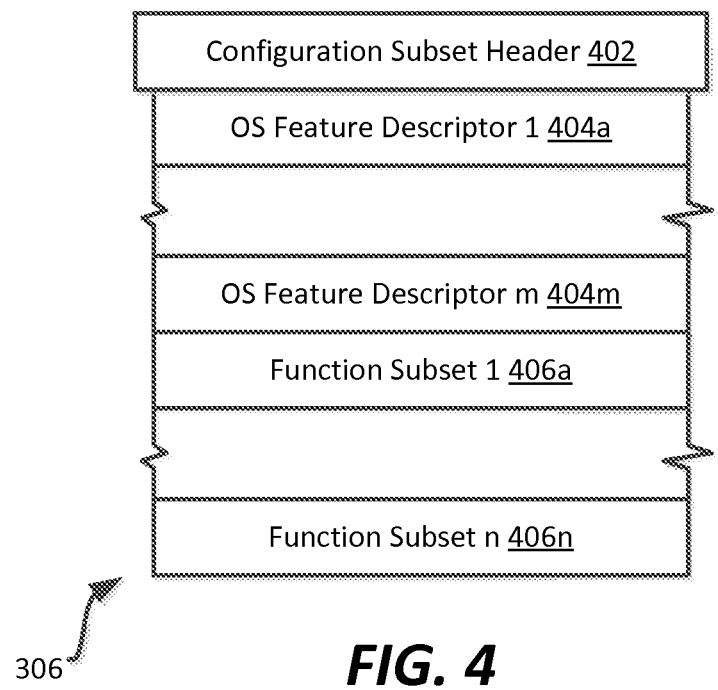
FIG. 4 is a logical diagram illustrating an organization of configuration-level characteristics of an extended capability descriptor set, according to an example embodiment.

As seen in FIG. 4, the configuration level subset 306 includes a header 402 as well as zero or more extended feature descriptors 404a-m that apply to a specific USB device configuration (i.e., configuration level 204). The configuration level subset 306 also can include within it zero or more function subsets 406a-n, each of which applies to specific functions within a device (within that configuration).

The configuration level subsets 306 each include a header 402 that defines a configuration value (i.e., the particular configuration to which the descriptor applies) and length of the configuration subset. The corresponding feature descriptors 404a-m can be any of a variety of extended capability feature descriptors at the configuration level 204, various types of which are further described below. The function subsets 406a-n define extended functions applicable within that configuration, and are structured as illustrated in FIG. 5.

Figure 5:
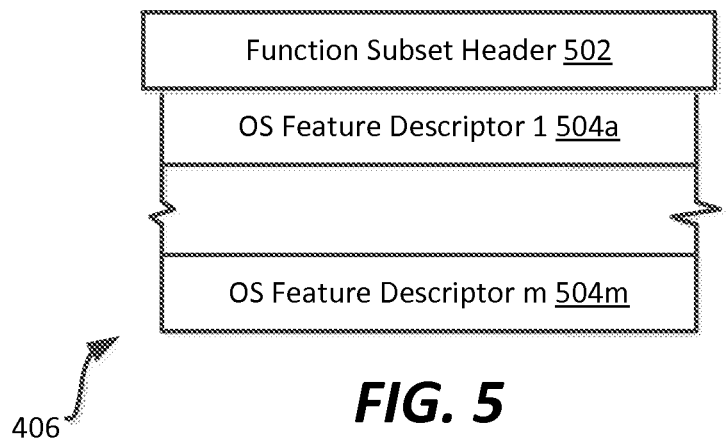
FIG. 5 is a logical diagram illustrating an organization of function-level characteristics of an extended capability descriptor set, according to an example embodiment.

As seen in FIG. 5, each function subset 406 includes a header 502 that includes, among other elements, an interface number of an interface to which the function applies (useable in multifunction devices to identify a particular interface), as well as a length of the overall function subset 406 and the length of the header itself. Each function subset 406 also includes zero or more feature descriptors 504a-m, each of which corresponds to and defines extended functions applicable within that function. For purposes of the present disclosure, a function is defined as a group of one or more interfaces. A non-composite device would have one function subset that applies to the interface or interfaces defined for the configuration. A composite device may have one or more feature descriptors 504, defining functions. Each function subset generally is within a configuration subset, and applies only to that configuration.

Figure 6:
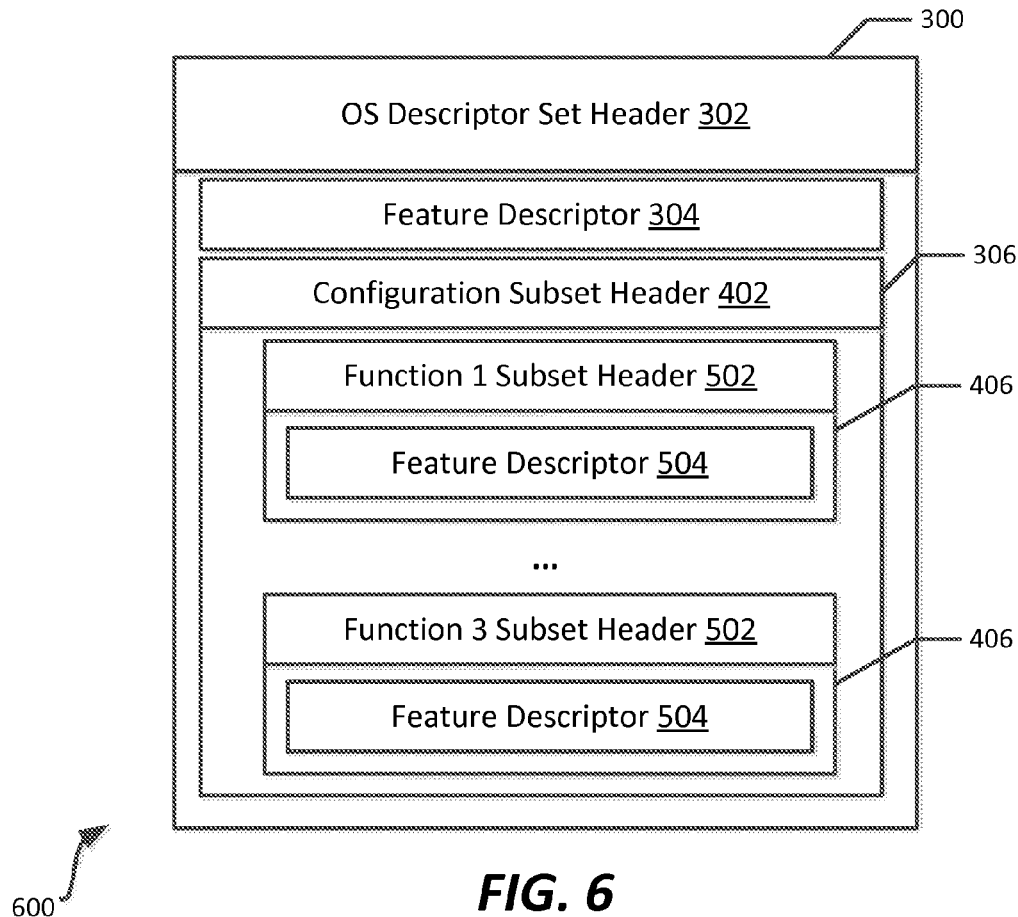
FIG. 6 is an example layout of an overall extended capability descriptor set for a composite device and including device- and function-level feature descriptors, according to an example embodiment.

Referring now to FIG. 6, an example layout 600 of a descriptor set of extended descriptors 124 is illustrated, showing the nesting of descriptors as outlined in FIGS. 3-5. The example layout 600 illustrates one possible arrangement of an extended descriptor set 124, based on the hierarchical arrangements in FIGS. 3-5, in which a device level feature descriptor and two function level feature descriptors are shown. As seen in layout 600, a descriptor set header 302 is associated with a feature descriptor 304, and a configuration level descriptor subset 306. The configuration level descriptor subset 306 includes configuration subset header 402, as well as one or more feature descriptors 404 at the configuration level (none shown in this example). Within the configuration level descriptor subset 306, a plurality of function subsets 406 are illustrated as function subsets 406a-c, each of which include a function subset header 502 and one or more feature descriptors 504.

Referring to FIGS. 3-6, it is noted that a variety of descriptor types can be defined as feature descriptors 304a-m, 406a-n, 504a-m at the device-wide scope 202, device configuration scope 204, or function scope 206. These descriptor types can include, for example, a feature compatible or model identifier type, a feature registry property type, a feature CCGP device type, a recovery time type, a preferred configuration type, and a model identifier type.

The feature compatible type descriptor defines a compatible device type identifier, and can include a string defining a compatible device identifier or sub-compatible device identifier. The compatible identifier descriptor can be addressed on a device level 202 or function level 206.

In some example embodiments, in particular those implemented using a host system having an operating system from among the MICROSOFT WINDOWS® family of operating systems, a feature registry property type descriptor adds per-device or per-function registry values that can be read by a USB stack or the device's driver. The feature registry property descriptor can be addressed on a device-side scope 202 or function scope 206, and can include, for example, a type of registry property affected, the name of the registry property, length, and property data to be included in the registry (i.e., the registry values to be set). The property data can define the format of the property to be set, including whether the property data is null-terminated, little-endian, big-endian, or otherwise formatted (e.g., unicode, integer, freeform etc.). In alternative embodiments, other types of operating system settings or features could be defined in this descriptor type.

In some other embodiments, a CCGP device feature descriptor can also be defined, and is used to indicate that the operating system should treat the device returning such a descriptor as a composite device irrespective of a number of interfaces reported by the device. As such, the CCGP device feature descriptor type has device-wide scope.

In still further example embodiments, a recovery time type descriptor is applied at a device-wide scope 202, and indicates to a host driver a minimum amount of time to recover after a port reset or port resume operation for a high, full, or low speed device. This descriptor allows the device to recover faster, for example, than the default of 10 milliseconds defined in the USB 2.0 specifications. In an example embodiment, the descriptor includes a separate setting for minimum times to recover after a port reset and a port resume; however, the same minimum time could be used, in alternative embodiments.

In a still further embodiment, a model identifier descriptor type defines a device model identifier, and can include a unique identifier that identifies a physical device. The model identifier descriptor can be addressed on a device-wide scope 202.

Additionally, an alternate set of descriptors can be defined for use and identified in the extended capability descriptor such that, when that alternate enumeration vendor-specific control request is received, the host computing system receives an indication that such alternate descriptors should be retrieved for use in enumerating the USB device. This can be used, for example, to morph the type of device based on the specific operating system in use by the host computing system. In such cases, an alternative set of standard descriptors can be retrieved. Accordingly, the platform capability descriptor can contain information indicating that for a particular minimum operating system, the device wants to behave differently. The host computing system will then issue a command to inform the device which minimum OS version the host is running. The host can then restart the entire enumeration process, allowing the device to return completely different descriptors. On a subsequent connection of that device, the host computing system will have cached the information about the alternate enumeration, and after retrieving the device descriptor, it can immediately issue the command. The host computing system then only has to re-fetch the device descriptor, and then continue with the rest of the descriptors. This will improve subsequent enumeration performance in the case of such alternative descriptors.

In still other embodiments, a preferred configuration index can be used to indicate which of multiple sets of descriptors should be used when enumerating a device, allowing the device to enumerate using different configuration descriptors based on, for example, the operating system version of the host computing device of whether the device is connected to a high power or low power USB port. Similar to the alternate set of descriptors, the preferred configuration index can be included in the feature descriptors, and can indicate to the host computing device that a preferred set of additional feature descriptors should be requested for enumeration of the device.

In addition to the descriptor types and variations described above, these extended descriptors could be extended to other types of variable features. For example, in some embodiments, descriptors could set different operating system settings or use different preferred configurations based upon a computing architecture of a host computing device (e.g., whether the host device is an x86-based or ARM-based computing device). For example, whereas in an x86 host system one or more drivers might be loaded, in a tablet, mobile phone, or other ARM-based host system, the descriptor could provide a link to a downloadable application that provides the USB connectivity functionality expected of the device. Other descriptor variations could be used as well, such as indicating a particular platform architecture within the extended capability descriptor, rather than in one or more extended descriptors.

It is further noted that, based on the descriptors available for use, various operating-system values and capabilities can be set depending upon a particular operating system of the host system without requiring any settings provided from a setup information file (i.e., an "INF" file) or a separate update file, thereby improving the "plug-and-play" functionality of the device and enhancing the amount of customization of the operation of a USB device when that device is used with different types of host systems. Additionally, the extended capability descriptors provided herein do not interfere with existing extended capability descriptor functionality that is limited to a per-function (i.e., per-interface) basis, and which resulted in some device compatibility issues. Host devices implementing an operating system that supports the extended descriptors of the present disclosure will therefore both provide backward compatibility for devices that include those previous types of descriptors as well as the improved compatibility with and customization of USB devices to which they are interconnected.

Figure 7:
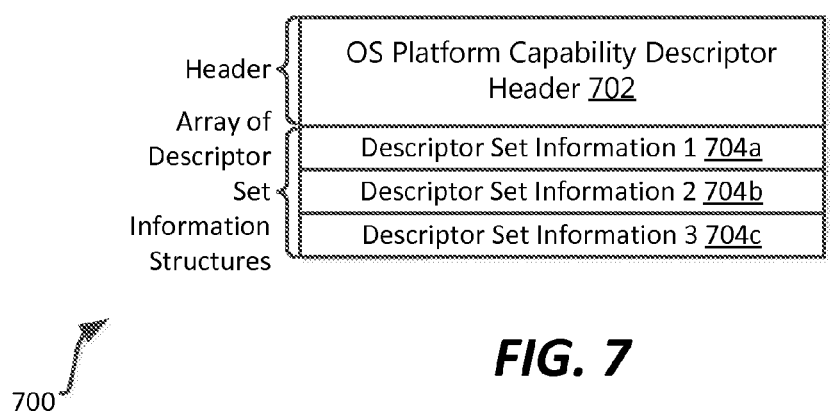
FIG. 7 is an example logical layout of a platform capability descriptor useable to provide identification of one or more extended capability descriptor sets, according to an example embodiment.

Referring now to FIG. 7 an example logical layout of an extended capability descriptor 700 is shown. The extended capability descriptor 700 is useable to allow a USB device to identify to a host computing system that the extended capability descriptor sets of the present disclosure are supported by that particular device. In particular, the extended capability descriptor 700 provides a header 702 and one or more descriptor set identifiers 704a-c.

The header 702 generally includes descriptor type, length, and capability type information, as well as a particular code identifying the device as supporting the type of extended descriptors provided for herein. Based on that code (e.g., a universally unique identifier, or UUID, or other type of value), a receiving host system (e.g., host computing system 102 of FIG. 1) can determine whether it is capable of using the extended descriptors included in the device. The accompanying one or more descriptor set identifiers can include, among other elements, an operating system version identifier used to identify a minimum operating system level able to support a particular extended descriptor set, a size of the corresponding descriptor set, and a vendor code used to identify a particular extended descriptor set. In some embodiments, each of the one or more descriptor set identifiers can also include an alternate enumeration identifier, indicative of whether the device should, when the alternate enumeration control transfer is received, return non-default descriptors for the communication interface (e.g., USB). Such information, and in particular the vendor code, can be used by a host computing device to issue one or more vendor-specific control requests to the device to obtain corresponding extended descriptor sets, if that host device has an adequately up to date operating system identified by the operating system identifier. Details regarding a method of requesting the extended capability descriptor 700 and associated extended descriptor sets are provided below, and shown in FIGS. 8-9.

It is noted that, because the extended capability descriptor 700 itself is intended to be supported in the USB specification (although the unique code defining the extended capability is not), retrieving an extended capability descriptor 700 from another device that does not support the extended descriptors will not cause that device to freeze/hang, and therefore reliable operation across all USB devices can be improved. Rather, based on the value retrieved in the extended capability descriptor 700, one or more extended descriptors can be requested and used to enumerate the device with the host computing system, using an operating system-specific set of descriptors, or alternate descriptors that can define the device to the host computing system in a different manner than would otherwise be provided by the default set of standard descriptors. Beyond the flexibility such an arrangement provides, it also ensures compatibility with devices that do not support extended descriptors or alternate configurations, since such descriptors would be requested only upon a determination that those descriptors are present in the device (as indicated by the extended capability descriptor 700).

Figure 8:
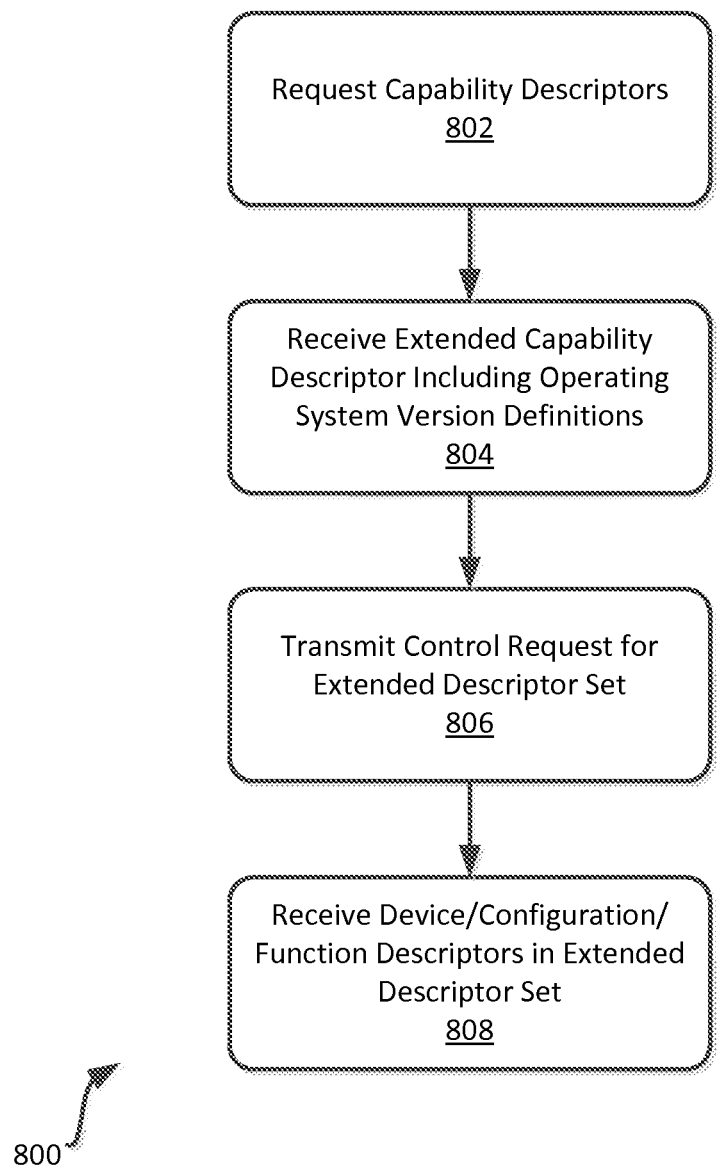
FIG. 8 is a flowchart of an example method for extraction of operating-system-specific characteristics, according to an example embodiment.
Figure 9:
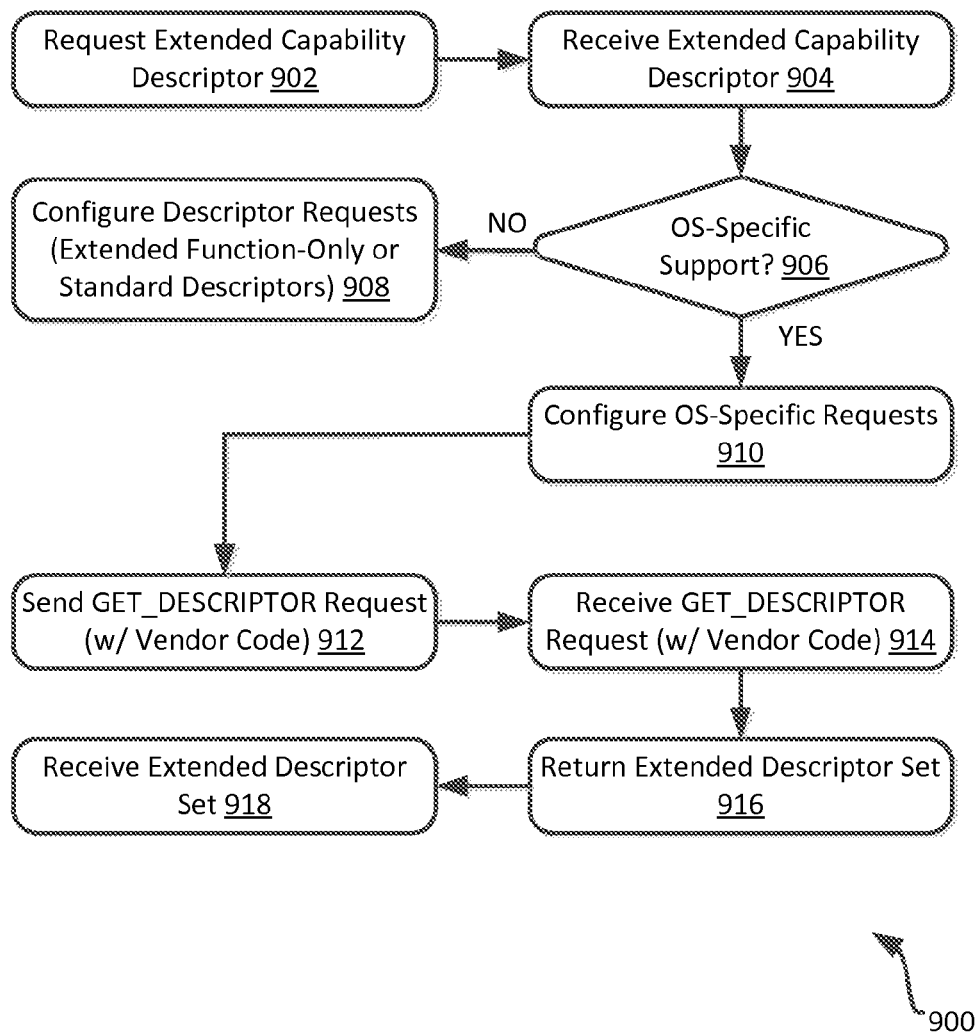
FIG. 9 is a detailed flowchart of a method for detecting non-standard capabilities of a device communicatively connected to a host computing system, according to an example embodiment.

Referring now to FIGS. 8-9, additional details are described regarding a process by which an extended capability descriptor and associated extended descriptor sets may be requested from a device via a USB interface. In embodiments, the method of FIG. 8 may be performed by a host computing device (e.g., host computing system 102). In particular, FIG. 8 shows a top-level method of an example procedure for obtaining extended descriptor sets according to the present disclosure. Generally, the method 800 includes requesting 802, via a USB interface, a standard descriptor, which includes one or more extended capability descriptors. The request can be transmitted from a host computing system to a device. Among the standard descriptors, an extended capability descriptor can be included, for example, within a set of Binary Device Object Store (BOS) device capability descriptors included within the USB standards. The extended capability descriptor is received, for example alongside the other descriptors included in the requested descriptor set at operation 804. This receipt of standard descriptors occurs, for example, at the host computing system. The standard descriptors include one or more extended capability descriptors, which in turn may include operating system version definitions. In embodiments, the host computing system then assesses the extended capability descriptor to determine if the extended descriptors of the present disclosure are supported, for example based on a code included within the extended capability descriptor.

Next, method 800 proceeds to operation 806, wherein one or more control requests are made for an extended descriptor set. In embodiments, the host computing device can issue one or more device requests to the device via a USB interface, to request one or more of the newly-defined extended descriptors in an extended descriptor set (e.g., using a vendor-specific control request, as discussed below in FIG. 9). A control transfer is a data structure that is conveyed from the host to the peripheral device. A control transfer contains the following fields:

bmRequestType—a mask field indicating (a) the direction of data transfer in a subsequent phase of the control transfer; (b) a request type (standard, class, vendor, or reserved); and (c) a recipient (device, interface, endpoint, or other). The primary types of requests specified in the "request type" field are the "standard" and "vendor" types, which will be discussed below.

bRequest—a request code indicating one of a plurality of different commands to which the device is responsive.

wValue—a field that varies according to the request specified by bRequest.

wIndex—a field that varies according to request; typically used to pass an index or offset as part of the specified request.

wLength—number of bytes to transfer if there is a subsequent data stage.

All USB devices are designed to support and respond to "standard" requests supported in the USB specification, and referred to herein as "USB-specific" requests. It is noted that when extended descriptors are applied using other communications interfaces, a set of standard request and standard descriptors may change, according to the specification for that alternative interface.

In USB-specific requests, the request type portion of the bmRequestType field contains a predefined value indicative of the "standard" request type. USB devices can optionally support "vendor" requests—referred to herein as "device-specific" requests. In a device-specific request, the request type portion of the bmRequestType field contains a predefined value to indicate a "vendor" request type. In the case of device-specific requests, the USB specification does not assign request codes, define the meanings of wValue and wIndex, or define the format of returned data. Rather, each device has nearly complete control over the meaning, functionality, and data format of device-specific requests. Specifically, the vendor or designer of a device can define its own requests and assign device-specified request codes to them. This allows devices to define their own device requests for use by host computers, and provides flexibility for manufacturers of peripherals.

In the context of the present disclosure, based on a previous request of an extended capability descriptor, the request, and in particular the wValue and wIndex fields, can be populated with a particular set of values. Specifically, the wIndex value can be set to a known index for descriptors supported by the new extended capability descriptors of the present disclosure. It is noted that generally, for each standard USB-specific request code, the USB specification sets forth the meanings of wValue and wIndex, as well as the format of any returned data. Additionally, for previous versions of the present extended capability descriptor arrangement, a predetermined wIndex may be used without verifying support for such values, leading to a possibility that the device receiving the request will hang or otherwise react with an error to an index value that is undefined in that device.

At operation 808, the descriptors in the extended descriptor set (e.g., device, configuration, and/or function descriptors) are received. In embodiments, the host computing system can receive the one or more extended descriptors from the device. The host computing system can use those extended descriptors to define operation of the device, install any drivers, and otherwise enumerate the device. It is noted that the host computing system can repeat the vendor-specific control request as desired to obtain different information from the device as needed.

Referring now to FIG. 9, additional details regarding the request and determination of compatibility with the extended descriptors of the present disclosure are provided. In particular, in method 900, a request is transmitted at operation 902 for an extended capability descriptor, for example as part of a BOS descriptor set. This request can be transmitted, for example, from host computing system to the device. The request is received, and the corresponding extended capability descriptor is returned at operation 904 (e.g., along with other descriptors in the BOS descriptor set). If the returned set of capability descriptors lacks the extended capability descriptor, or if the returned extended capability descriptor lacks any value that indicates support for the extended descriptors of the present disclosure, operation 906 determines that the host computing system can configure descriptor requests that are not operating system specific. Accordingly, at operation 908, descriptor requests in this case would revert to existing descriptor request process, This can include a request for only standard descriptors, or a request for extended descriptors that are not supported or identified using the extended capability descriptor (e.g., in a prior version of the extended descriptors described herein). Otherwise, if the extended capability descriptor includes a code (e.g., UUID) that indicates support for the extended descriptors, a request for extended descriptor sets can be generated at operation 910, for example by a host computing system. This can include one or more extended descriptor sets that each corresponds to a different minimum operating system level supported by the device.

At operation 912, a vendor-specific control request is transmitted that includes a bRequest value identifying a vendor code that corresponds to the supported minimum operating system requirements. For example, the vendor-specific control request can be sent from the host computing system to the device. A compatible device receives the request at operation 914, and is configured to respond to such a request by returning an extended descriptor. The extended descriptor can be, for example, any of the descriptor types discussed above in connection with FIGS. 3-6.

More specifically, at operation 916 the vendor-specific control request is received. For example, based on such a request, a device determines whether the vendor-implemented request value corresponds to the value identified in the vendor-specific control request (e.g., the bRequest value defined in the vendor code in the extended capability descriptor. The requested one or more extended descriptors are then returned in response to the request. At this point, in the embodiment shown, the extended capability descriptor set is received at operation 918, which can include, for example, one or more extended descriptors received by a host computing device.

In a possible implementation of this system, the device request is used to request one of a plurality of available descriptors from the device. The bRequest field of the host-specific request for extended descriptors indicates which of the plurality of available extended descriptors are to be returned. The device returns the descriptor referred to by bRequest.

Referring to FIGS. 1-9 generally, the techniques described above allow an operating system designer to specify extended descriptors that devices can implement to provide additional data about themselves-data that is not directly addressed by the USB specification. For example, the techniques described above allow an operating system to specify the extended descriptor 123 and extended descriptors 124 of FIG. 1. The operating system of a host system then uses the extended descriptors to identify features of a device that are not supported by the communication interface (e.g., USB) that is used by the device that support non-standard USB DWG class codes and/or subclass codes to determine one or more device drivers to control the devices.

In addition to the above, the extended capability descriptors and extended descriptors of the present disclosure provide further advantages over existing extended descriptors. In particular, by using a request of an existing, defined descriptor included in the USB specification (i.e., the extended capability descriptor), that descriptor will advertise whether operating system-specific capabilities are supported that allow for device, configuration, and function level capabilities to be defined. This ensures backward compatibility (i.e., it will not cause unexpected conduct by USB devices not supporting the extended capabilities). In addition, the extended descriptors discussed herein allow devices to describe themselves on a device-wide basis, rather than on a per function basis. Additionally, using the extended capability descriptors of the present disclosure, the device can expose a least common denominator set of features to each host system to which it is connected, while providing extended functionality to supported host devices.

Finally, although the present disclosure describes the extended capability descriptors and extended descriptors as directed to use within a USB interface, it is recognized that in some embodiments, the extended capability descriptor and extended descriptors are not so limited. For example, the extended capability descriptor and extended descriptors can be included in one or more alternative interface types, such as a PCI, Bluetooth, or other type of wired or wireless interface.

The embodiments and functionalities described herein may operate via a multitude of computing systems such as the host computing system 102 and device 114 described above with reference to FIG. 1, including wired and wireless computing systems, mobile computing systems (e.g., mobile telephones, tablet or slate type computers, laptop computers, etc.). In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 10 through 12 and the associated descriptions provide a discussion of a variety of operating environments in which embodiments of the invention may be practiced. However, the devices and systems illustrated and discussed with respect to FIGS. 10 through 12 are for purposes of example and illustration and are not limiting of a vast number of computing device configurations that may be utilized for practicing embodiments of the disclosure, described herein.

Figure 10:
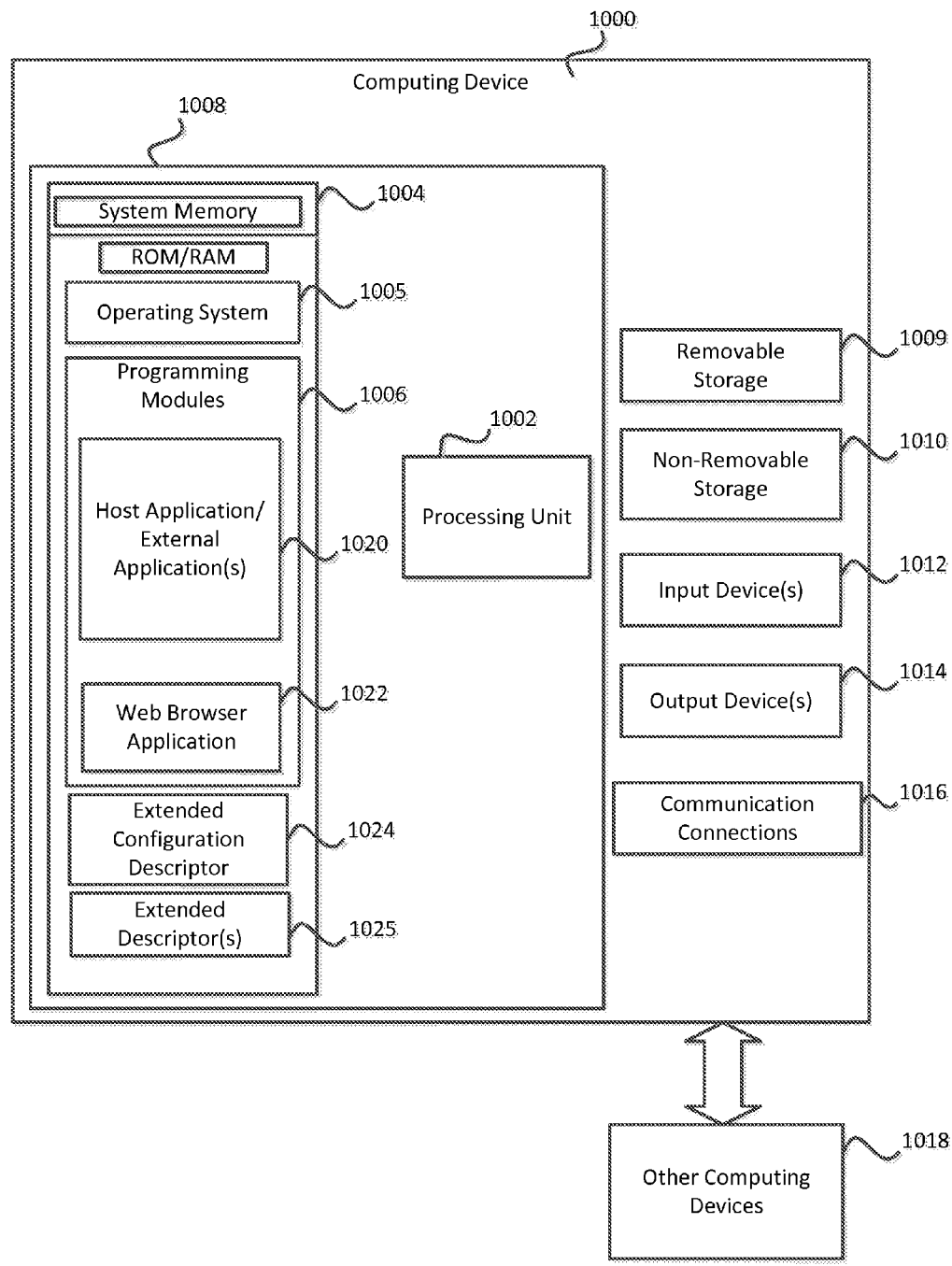
FIG. 10 is a simplified block diagram of a computing device with which present embodiments may be practiced.

FIG. 10 is a block diagram illustrating example physical components of a computing device 1000 with which embodiments of the disclosure may be practiced. The computing device components described below may be suitable for the computing devices described above, for example, the host computing system 102 or device 114 of FIG. 1. In a basic configuration, computing device 1000 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination. System memory 1004 may include operating system 1005 and one or more programming modules 1006, which are suitable for running applications, such as a client application or server applications. Operating system 1005, for example, may be suitable for controlling the operation of computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010.

As stated above, a number of program modules and data files may be stored in system memory 1004, including operating system 1005. While executing on processing unit 1002, programming modules 1006 may perform processes including, for example, one or more of the stages of the methods discussed in FIGS. 8-9. The aforementioned process is an example, and processing unit 1002 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality of server applications 1020 or client applications 1022 may be implemented via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The term computer readable media as used herein may include computer storage media. Computer storage media may include volatile and nonvolatile, removable or non-removable media implemented in any method or technology for storage of information, such as computer readable instructions, data structures, or program modules. System memory 1004, removable storage 1009, and non-removable storage 1010 are all computer storage media examples (i.e., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other storage devices, or may include any other article of manufacture which can be used to store information and which can be accessed by computing device 1000. Any such computer storage media may be part of device 1000. As described herein, computer storage media does not include communication media (defined hereinafter), or any propagated data signals or modulated data signals. Computing device 1000 may also have input device(s) 1012 such as a keyboard, a mouse, a pen, a sound input device, a touch input device, etc. Output device(s) 1014 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Computing device 1000 may include communication connections 1016 allowing communications with other computing devices 1018. Examples of suitable communication connections 1016 include, but are not limited to, RF transmitter, receiver, and/or transceiver circuitry; universal serial bus (USB), parallel, or serial ports, and other connections appropriate for use with the applicable computer readable media. In connection with the present disclosure, it is noted that the operating system 1005 of computing device 1000 can be one of a number of versions of operating systems, and may, in such cases, enable differing sets of functionality in the other computing devices 1018, such as through use of an extended configuration descriptor 1024 and associated extended descriptors 1025 stored in or received by the system memory 1004, removable storage 1009, or non-removable storage 1010 as well as existing platform capability descriptor values managed by the other computing devices 1018.

Figure 11A:
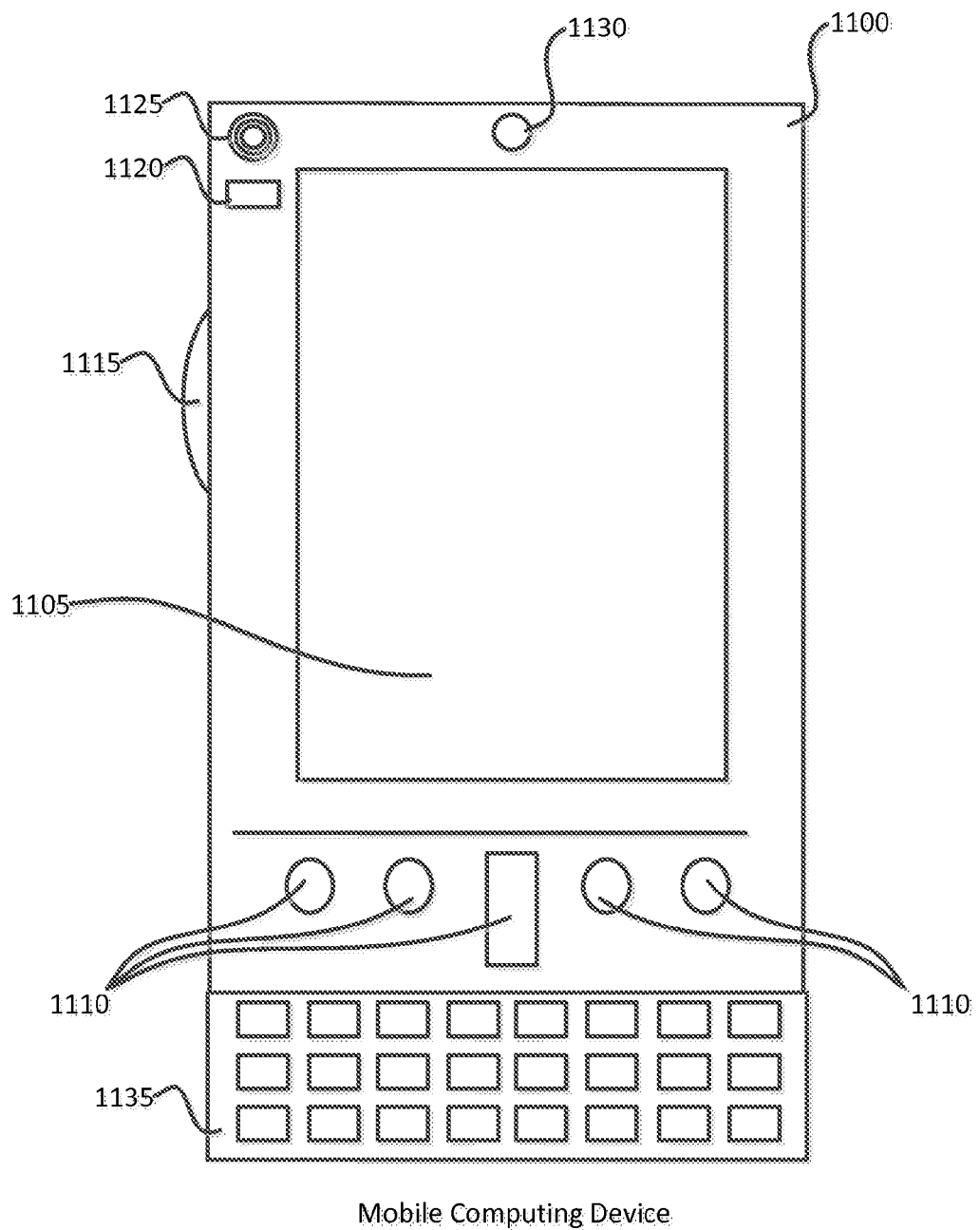
FIGS. 11A and 11B are simplified block diagrams of a mobile computing device with which present embodiments may be practiced.
Figure 11B:
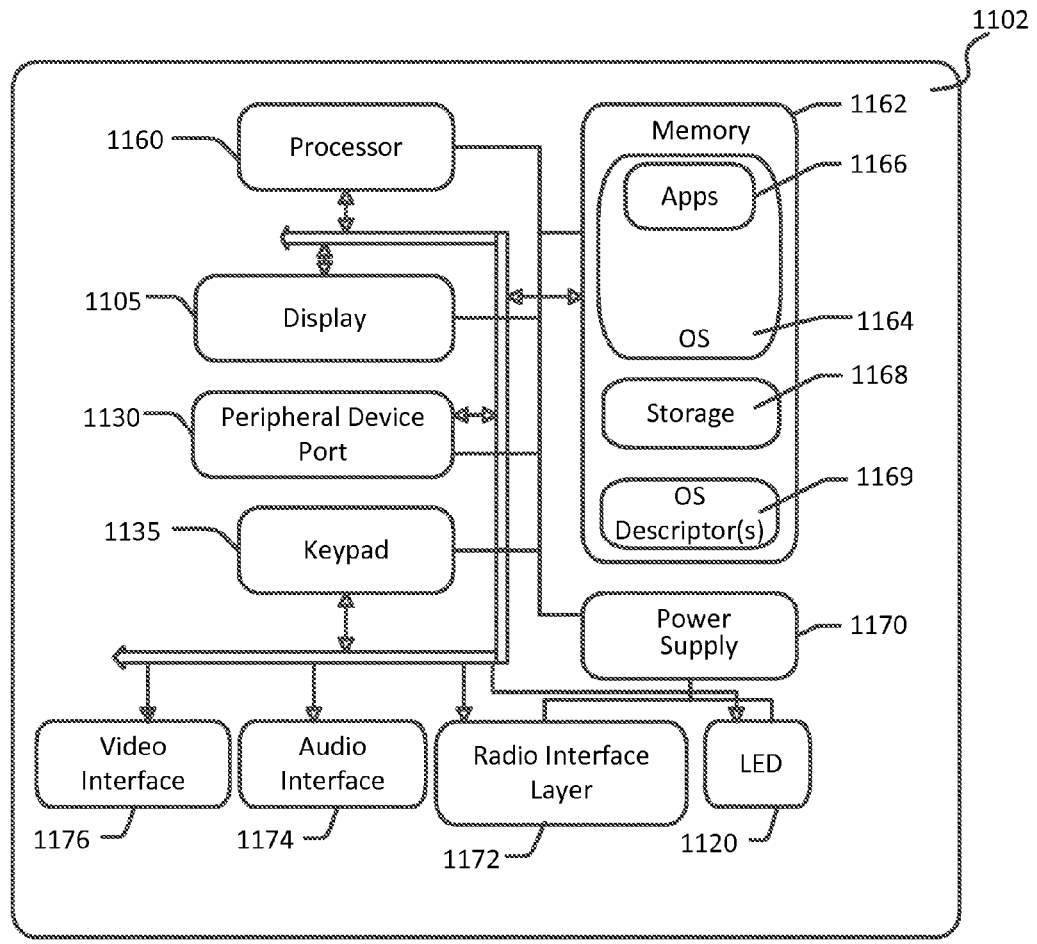

FIGS. 11A and 11B illustrate a suitable mobile computing environment, for example, a mobile computing device 1100, such as a smart phone, a tablet personal computer, a laptop computer, and the like, with which embodiments of the disclosure may be practiced. With reference to FIG. 11A, an example mobile computing device 1100 for implementing the embodiments is illustrated. In a basic configuration, mobile computing device 1100 is a handheld computer having both input elements and output elements. Input elements may include touch screen display 1105 and input buttons 1110 that allow the user to enter information into mobile computing device 1100. Mobile computing device 1100 may also incorporate an optional side input element 1115 allowing further user input. Optional side input element 1115 may be a rotary switch, a button, or any other type of manual input element. In alternative embodiments, mobile computing device 1100 may incorporate more or less input elements. For example, display 1105 may not be a touch screen in some embodiments. In yet another alternative embodiment, the mobile computing device is a portable phone system, such as a cellular phone having display 1105 and input buttons 1110. Mobile computing device 1100 may also include an optional keypad 1135. Optional keypad 1135 may be a physical keypad or a "soft" keypad generated on the touch screen display.

Mobile computing device 1100 incorporates output elements, such as display 1105, which can display a graphical user interface (GUI). Other output elements include speaker 1125 and LED 1120. Additionally, mobile computing device 1100 may incorporate a vibration module (not shown), which causes mobile computing device 1100 to vibrate to notify the user of an event. In yet another embodiment, mobile computing device 1100 may incorporate a headphone jack (not shown) for providing another means of providing output signals.

Although described herein in combination with mobile computing device 1100, in alternative embodiments the disclosure is used in combination with any number of computer systems, such as in desktop environments, laptop or notebook computer systems, multiprocessor systems, micro-processor based or programmable consumer electronics, network PCs, mini computers, main frame computers and the like. Embodiments of the disclosure may also be practiced in distributed computing environments where tasks are performed by remote processing devices that are linked through a communications network in a distributed computing environment; programs may be located in both local and remote memory storage devices.

FIG. 11B is a block diagram illustrating components of a mobile computing device used in one embodiment, such as the computing device shown in FIG. 11A. That is, mobile computing device 1100 can incorporate system 1102 to implement some embodiments. For example, system 1102 can be used in implementing a "smart phone" that can run one or more applications similar to those of a desktop or notebook computer such as, for example, browser, e-mail, scheduling, instant messaging, and media player applications. In some embodiments, system 1102 is integrated as a computing device, such as an integrated personal digital assistant (PDA) and wireless phone.

One or more application programs 1166 may be loaded into memory 1162 and run on or in association with operating system 1164. Examples of application programs include phone dialer programs, e-mail programs, personal information management (PIM) programs, word processing programs, spreadsheet programs, Internet browser programs, messaging programs, and so forth. Such application programs can also include application programs that assist in communicating with peripheral devices, such as device 114 of FIG. 1, above, via a peripheral device port. Accordingly, application programs 1166 can be used to implement differing functionality sets based on different extended capability descriptor sets supported by different versions of the operating system 1164.

System 1102 also includes non-volatile storage 1168 within memory 1162. Non-volatile storage 1168 may comprise computer storage media and may be used to store persistent information that should not be lost if system 1102 is powered down. Applications may be loaded into memory 1162 and run on the device 1100, including the various client and server applications described herein. In addition, in the example shown, one or more OS descriptors 1169, including an extended capability descriptor or set of extended descriptors, as described above, could be included within the memory 1162.

System 1102 has a power supply 1170, which may be implemented as one or more batteries. Power supply 1170 might further include an external power source, such as an AC adapter or a powered docking cradle that supplements or recharges the batteries.

System 1102 may also include a radio 1172 that performs the function of transmitting and receiving radio frequency communications. Radio 1172 facilitates wireless connectivity between system 1102 and the "outside world", via a communications carrier or service provider. Transmissions to and from radio 1172 are conducted under control of the operating system 1164. In other words, communications received by radio 1172 may be disseminated to application programs 1166 via operating system 1164, and vice versa.

The embodiment of system 1102 shown includes two types of notification output devices; light emitting diode (LED) 1120 that can be used to provide visual notifications and an audio interface 1174 that can be used with speaker 1125 to provide audio notifications. These devices may be directly coupled to power supply 1170 so that when activated, they remain on for a duration dictated by the notification mechanism even though processor 1160 and other components might shut down for conserving battery power. LED 1120 may be programmed to remain on indefinitely until the user takes action to indicate the powered-on status of the device. Audio interface 1174 is used to provide audible signals to and receive audible signals from the user. For example, in addition to being coupled to speaker 1125, audio interface 1174 may also be coupled to a microphone to receive audible input, such as to facilitate a telephone conversation. In accordance with embodiments of the present disclosure, a microphone may also serve as an audio sensor to facilitate control of notifications, as will be described below. System 1102 may further include video interface 1176 that enables an operation of on-board camera 1130 to record still images, video stream, and the like.

A mobile computing device implementing system 1102 may have additional features or functionality. For example, the mobile computing device 1100 may also include additional data storage devices (removable and/or non-removable) such as, magnetic disks, optical disks, or tape.

Data/information generated or captured by the mobile computing device 1100 and stored via the system 1102 may be stored locally on the mobile computing device 800, as described above, or the data may be stored on any number of storage media that may be accessed by the device via a radio 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio 1172 or via a distributed computing network. Similarly, such data/information may be readily transferred between computing devices for storage and use according to well-known data/information transfer and storage means, including electronic mail and collaborative data/information sharing systems.

Figure 12:
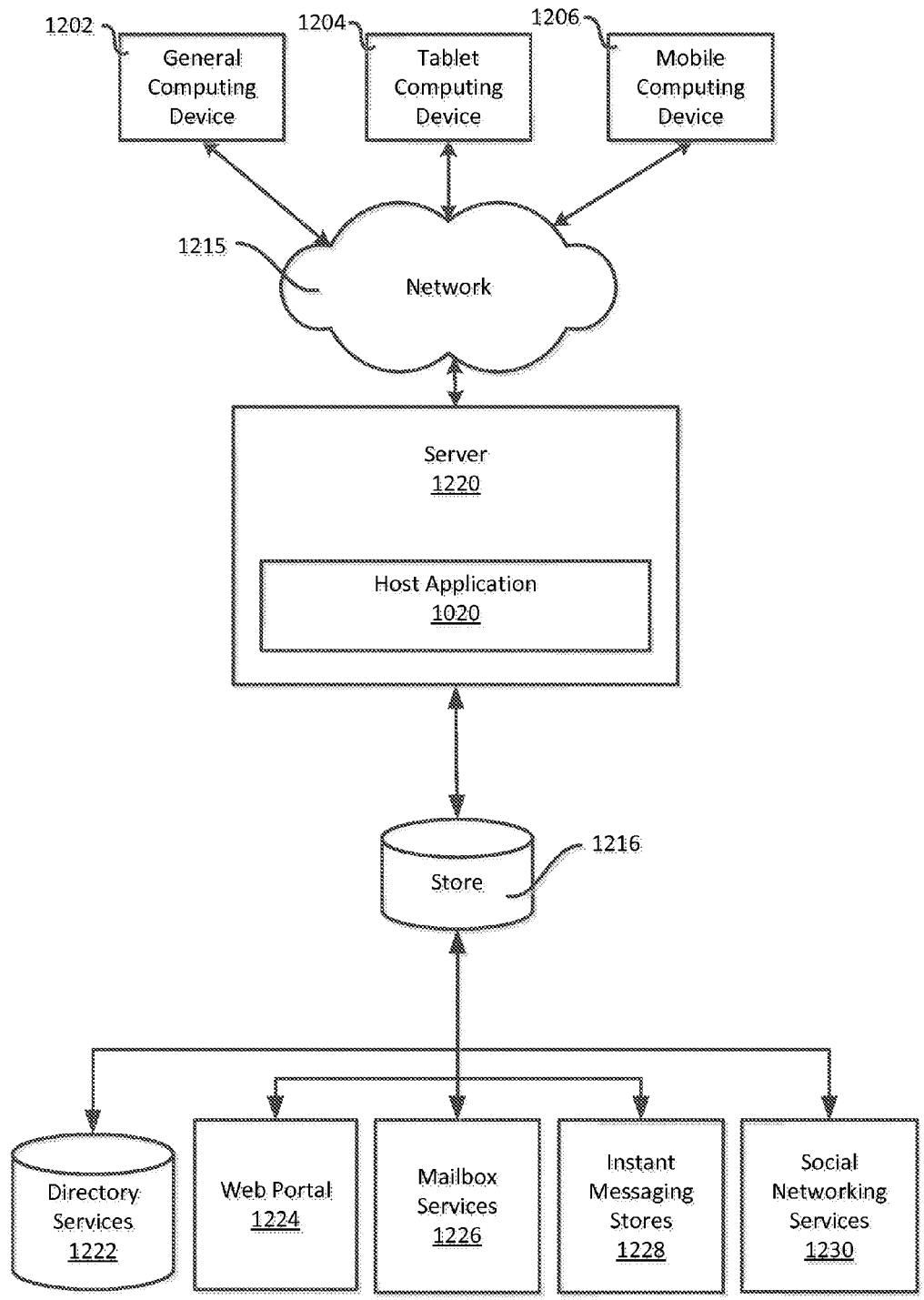
FIG. 12 is a simplified block diagram of a distributed computing system in which present embodiments may be practiced.

FIG. 12 illustrates a system architecture for providing a remote application, such as a downloadable driver or web application useable for USB interface configuration, to one or more client devices, as described above. Content developed, interacted with or edited in association with the remote application may be stored. For example, various documents may be stored using directory services 1222, web portals 1224, mailbox services 1226, instant messaging stores 1228 and social networking sites 1230. The remote application may use any of these types of systems or the like for enabling data utilization, as described herein. A server 1220 may provide the remote application to clients. As one example, server 1220 may be a web server providing the host application 1020, over the web. Server 1220 may provide the remote application over the web to clients through a network 1215. Examples of clients that may access a remote application may include any general purpose personal computer 1202, a tablet computing device 1204 and/or mobile computing device 1206 such as smart phones, each of which may include a USB or other analogous interface. Any of these devices may obtain content from the store 1216. For example, the downloadable driver or web application can be provided to a host computing system, such as host computing system 102 of FIG. 1, which may be implemented as any of general purpose personal computer 1202, a tablet computing device 1204 and/or mobile computing device 1206.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Further, the disclosed methods' stages may be modified in any manner, including by reordering stages and/or inserting or deleting stages, without departing from the disclosure.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A device comprising:
   a communication interface;
   a memory configured to store a plurality of descriptors accessible by a host computing system communicatively connected to the communication interface, the plurality of descriptors including:
   an extended capability descriptor including a header and at least one element, wherein the extended capability descriptor provides an identification of a minimum operating system version able to support an extended descriptor set; and
   one or more extended descriptors included in the extended descriptor set, the one or more extended descriptors recognizable to a host computing system executing at least the minimum operating system version and useable to enumerate the device thereon;
   wherein the device is configured to:
   receive a control request via a USB interface to obtain an extended descriptor set including the one or more extended descriptors, the control request based on the extended capability descriptor and an operating system version of the host computing system; and provide, in response to the control request, an extended descriptor set including the one or more extended descriptors defining functionality of the device to be enumerated at the host computing system.

2. The device of claim 1, wherein the extended capability descriptor is included in a plurality of Binary Device Object Store (BOS) descriptors.

3. The device of claim 1, wherein the extended capability descriptor includes at least one element indicating the existence of an alternate enumeration of the device to a host computing system.

4. The device of claim 1, wherein the extended descriptor set defines a set of extended descriptors supported by a host computing system having a minimum operating system version.

5. The device of claim 1, wherein the one or more extended descriptors in the extended descriptor set include a descriptor applicable to an entire device.

6. The device of claim 5, wherein the one or more extended descriptors in the extended descriptor set further include a descriptor applicable to a device configuration.

7. The device of claim 5, wherein the zero or more extended descriptors in the extended descriptor set further include a descriptor applicable to a function provided by the device.

8. The device of claim 1, wherein the one or more descriptors have a plurality of different descriptor types, the descriptor types selected from a group of descriptor types consisting of:
- a feature registry property type;
- a feature CCGP device type;
- a feature compatible ID type;
- a recovery time type;
- a preferred configuration type; and
- a model identifier type.

9. The system of claim 1, wherein the device comprises a multifunction peripheral device having a plurality of functions, and wherein the extended capability descriptor set includes one or more descriptors defining features of the entire device and applicable to each of the plurality of functions.

10. A method comprising:
transmitting a request to a device from a host computing system;
receiving an extended capability descriptor identifying to the host computing system at least one extended descriptor set stored on the device, wherein the extended capability descriptor identifies a minimum operating system version able to support a corresponding extended descriptor set;
determining whether the extended capability descriptor indicates that the device supports non-standard capabilities supported by an operating system version of the host computing system; and
transmitting a control request to the device via a USB interface to obtain an extended descriptor set supported by the device, the control request including a vendor code based on the extended capability descriptor and an operating system version of the host computing system.

11. The method of claim 10, further comprising:
determining whether the extended capability descriptor indicates that the device supports an alternate enumeration; and
transmitting a control request including information from the extended capability descriptor identifying an alternate descriptor set corresponding to the alternate enumeration.

12. The method of claim 10, wherein the extended capability descriptor includes a plurality of elements, each element including an identification of a minimum operating system version able to support a corresponding extended descriptor set, a length of the corresponding extended descriptor set, and a vendor code identifying the device.

13. The method of claim 10, further comprising receiving, in response to the control request, an extended descriptor set including a set of non-standard descriptors defining capabilities of the device available to the host computing system based on the operating system version.

14. The method of claim 13, wherein the extended descriptor set includes at least one descriptor having a device-wide scope.

15. The method of claim 14, wherein the extended descriptor set includes a second at least one descriptor at a device configuration level.

16. The method of claim 10, wherein the extended descriptor set includes a descriptor having a host architecture descriptor type, the host architecture type defining a capability available to the host computing device dependent upon a computing architecture of the host computing device.

17. A computer storage medium including computer-executable instructions stored thereon which, when executed by a computing device, cause the computing device to perform a method comprising:
transmitting a request to a device for one or more descriptors stored at the device, the one or more descriptors including an extended capability descriptor, the request transmitted from a host computing system via an interface communicatively connecting the device to the host computing system;
receiving the extended capability descriptor at the host computing system, wherein the extended capability descriptor includes one or more elements each identifying a different extended capability descriptor set, at least one of the elements identifying a minimum operating system version able to support a corresponding extended descriptor set;
transmitting a second request to the device from the host computing system, the second request corresponding to a request for an extended descriptor set identified based on contents of the extended capability descriptor and an operating system of the host computing system; and
in response to the second request, receiving a set of extended descriptors useable to enumerate the device with the host computing system and defining functionality supported by the operating system of the host computing system.

* * * * *